Sept. 20, 1932.    E. DE BRUIJN    1,878,679
PRODUCT OF MANUFACTURE
Filed Nov. 12, 1930
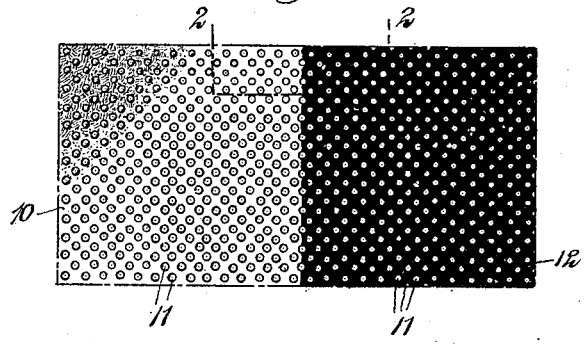
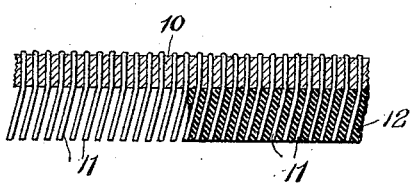
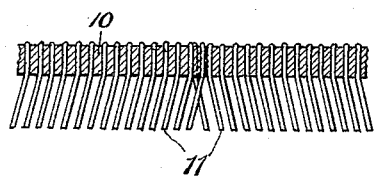
WITNESSES
INVENTOR
Emil de Bruijn.
BY
ATTORNEYS.

Patented Sept. 20, 1932

1,878,679

UNITED STATES PATENT OFFICE

EMIL DE BRUIJN, OF ROSLYN, PENNSYLVANIA; THERESA M. DE BRUIJN EXECUTRIX OF SAID EMIL DE BRUIJN, DECEASED

PRODUCT OF MANUFACTURE

Application filed November 12, 1930. Serial No. 495,275.

This invention relates to a new product of manufacture which has many practical uses for the purpose of wear and to present a tread having an anti-slip or non-skid surface.

In accordance with the invention there is produced a new product which may be used in tires, foot coverings and other analogous devices requiring a mechanical structure having a modulus of elasticity and resiliency, and also the power of grip or purchase to prevent slipping or skidding.

The invention has for its general object the provision of a product or material of the indicated character which will be durable, efficient and inexpensive.

The nature of the invention and its distinguishing features and advantages will appear when the following specification is read in connection with the accompanying drawing, in which Figure 1 is an inverted plan view of a piece of the product made in accordance with the invention, a portion thereof being broken away;

Figure 2 is a section on the line 2—2 of Figure 1;

Figure 3 is a section showing the disposition of the pins or wire teeth.

The product of the present invention will include a structure like card clothing or its equivalent. The structure as shown in the drawing will include flexible or semi-rigid material 10 such as stout textile fabric or other suitable or closely analogous material, and pins or wire teeth 11 extend through the material 10 and project on one side thereof. These pins or teeth are produced from substantially U-shaped material, such as wire, which are secured to the material 10 according to a well known method of manufacture. It is to be understood that the material 10 will have applied thereto a suitable backing material to prevent the pins or wire teeth 11 from being pushed out of position through the material 10. The pins or wire teeth 11 are disposed obliquely in relation to the material 10 which presents a uniform body portion of uniform thickness throughout. The pins or wire teeth 11 are of equal length and are spaced in staggered relation with respect to each other. The pins or wire teeth 11 may be arranged in a series of rows, and the pins or wire teeth of one series being disposed obliquely in one direction reversely of or opposite to the pins or teeth in the other series of rows, as shown most clearly in Figure 3.

In accordance with the main feature of the invention the structure hereinabove described has applied thereto, according to known methods of manufacture, a resilient and elastic composition, or material having these properties or qualities, such as soft rubber 12 which is applied in the form of a layer so as to be secured to or to adhere to the material 10 with the pins or wire teeth 11 embedded in or projecting through the material 12. The material 12 provides the necessary support for the pins or wire teeth 11 and also prolonging the life thereof because of the fact that it will be subjected to wear, the material being resilient and elastic will mutually combine with the material 10 to assume different formations and shapes either curved or straight. The material 12 will yield and allow the pins or wire teeth 11 to project therethrough and readily grip or take purchase on the road surface to prevent slipping or skidding. The pins or wire teeth 11 together with the material 12 will provide a very tough tread capable of rough usage and of long life. By having rows of pins or wire teeth 11 disposed in one direction and other rows in an opposite or reverse direction with respect to the contact surface slipping or skidding will be prevented, and at the same time the pins or wire teeth 11 together with the material 12 will yield to pressure thereby serving as a shock absorber or cushion.

From the foregoing it will be apparent that there has been described a new product of manufacture which will have many practical uses and which may be used advantageously in tires, foot coverings such as rubber boots, rubbers and other closely analogous articles, for the purpose of presenting a wearing structure and also one which will have the power of gripping or taking purchase to prevent slipping or skidding.

I claim:

1. A new product of manufacture comprising the combination of card clothing, and a resilient composition in which the pins of the card clothing are embedded or implanted and which is secured to the body portion of the card clothing, said pins being arranged in series of rows, and the pins of one series of rows being disposed obliquely in one direction reversely of the pins of the other series of rows.

2. A new product of manufacture comprising a flexible body portion having wire teeth or pins and a resilient composition tread secured to said body portion surrounding the teeth or pins, said teeth or pins being disposed obliquely with respect to the contact surface of said tread, and the oblique disposition of certain of said teeth or pins being the reverse of that of the other teeth or pins.

3. A new product of manufacture comprising card clothing and a tread layer of soft rubber secured to the card and surrounding the pins of the card clothing, said pins being arranged in series of rows, and the pins of one series of rows being disposed obliquely in one direction reversely of the pins of the other series of rows.

EMIL de BRUIJN.